United States Patent [19]

Behring et al.

[11] Patent Number: 5,427,202
[45] Date of Patent: Jun. 27, 1995

[54] APPARATUS AND METHOD FOR FLUSHING TRANSMISSION FLUID

[76] Inventors: Melvin A. Behring, P.O. Box 1684, Seguin, Tex. 78155; David L. McNamara, 2807 Autumn Dr., Boise, Id. 83706

[21] Appl. No.: 208,578

[22] Filed: Mar. 11, 1994

[51] Int. Cl.⁶ ............................................. F16C 3/14
[52] U.S. Cl. ..................................... 184/1.5; 141/98
[58] Field of Search ................ 184/1.5, 106; 141/98, 141/192, 198

[56] References Cited

U.S. PATENT DOCUMENTS

| 2,222,516 | 11/1940 | Powell et al. | |
|---|---|---|---|
| 2,755,969 | 7/1956 | Rainero | 184/1.5 |
| 3,867,999 | 2/1975 | Cox . | |
| 4,095,673 | 6/1978 | Takeucki . | |
| 4,114,644 | 9/1978 | Piper . | |
| 4,745,989 | 5/1988 | DiMatteo . | |
| 4,869,346 | 9/1989 | Nelson | 184/1.5 |
| 4,946,005 | 8/1990 | Levine . | |
| 4,951,784 | 8/1990 | Bedi . | |
| 4,958,666 | 9/1990 | Kocourek et al. . | |
| 4,964,373 | 10/1990 | Bedi . | |
| 5,044,334 | 9/1991 | Bedi . | |
| 5,056,621 | 10/1991 | Trevino . | |
| 5,062,398 | 11/1991 | Bedi et al. . | |
| 5,062,500 | 11/1991 | Miller et al. . | |
| 5,092,429 | 3/1992 | Linares et al. . | |
| 5,238,085 | 8/1993 | Engelmann | 184/1.5 |
| 5,291,968 | 3/1994 | Brown | 184/1.5 |
| 5,318,080 | 6/1994 | Viken | 184/1.5 |

FOREIGN PATENT DOCUMENTS 0072299  3/1990  Japan ................................... 184/1.5

Primary Examiner—Thomas E. Denion
Attorney, Agent, or Firm—Richards, Medlock & Andrews

[57] ABSTRACT

An apparatus (10) is disclosed for completely flushing transmission fluid from a transmission in a vehicle (12). The apparatus includes a storage tank (18) which is connected to a cooler line (38, 40) extending between the transmission and a transmission cooler (radiator) so that the vehicle transmission pumps the used transmission fluid directly into the storage tank. Simultaneously, replacement fluid is supplied from a supply tank (20) and pumped into the dipstick tube (32) of the transmission by a suitable pump (22). In this manner, the used fluid is quickly and completely flushed from the transmission.

13 Claims, 2 Drawing Sheets

APPARATUS AND METHOD FOR FLUSHING TRANSMISSION FLUID

TECHNICAL FIELD OF THE INVENTION

This invention relates to the flushing of used automatic transmission fluid from consumer and industrial automatic transmissions while simultaneously replacing the used fluid with fresh transmission fluid.

BACKGROUND OF THE INVENTION

Many consumer and industrial devices today use automatic transmissions filled with automatic transmission fluid (ATF) as the working fluid. At regular intervals, this automatic transmission fluid should be removed from the transmission and replaced with fresh fluid as the fluid properties degrade with time and use and entrain contaminants and debris which are not fully removed by the filter in the transmission.

When considering the typical personal automobile, the process usually involves removing the transmission pan from the transmission and allowing the fluid to drain therefrom. The pan is then reinstalled and new transmission fluid is added through the dipstick tube to bring the transmission to the proper fluid level. However, this process has a significant disadvantage. Specifically, the fluid that is present at a given time in the oil pan is only a small portion of the fluid actually in the transmission. Typically, a good deal of the transmission fluid remains in the control circuits of the transmission, the torque converter and the transmission cooler. Therefore, a traditional transmission fluid change will really only change about one-quarter to one-third of the transmission fluid and the transmission will be forced to operate with a mixture of old fluid and new fluid, thereby reducing its efficiency.

With commercial vehicles, such as trucks and the like, the same disadvantage also exists. Further, there is additional economic pressure to make the fluid change operation efficient and rapid. Any time the vehicle is out of service for a transmission change, the vehicle is losing money for the owner.

Therefore, a need exists for an improved concept in the changing of automatic transmission fluid which overcomes the disadvantage of replacing only a portion of the fluid and also performs this operation rapidly, efficiently and accurately to minimize cost and down time of the vehicle. The process and machine outlined herein is for all cooler cooled automatic transmissions, and most generally for those with radiator cooler systems. If the transmission is air cooled, the method herein outlined will not work, but there have been very few air cooled transmissions made, and fewer still left in operation.

SUMMARY OF THE INVENTION

In accordance with one aspect of the present invention, an apparatus is provided to flush transmission fluid from a vehicle. The vehicle has a transmission fluid cooler with a first line extending from the transmission to the cooler to carry the fluid to the cooler and a second line from the cooler to the transmission to carry the cooled fluid back to the transmission. The apparatus includes a storage tank and a means to connect one of the lines to the storage tank to direct the old automatic transmission fluid flowing through the line into the storage tank. A supply tank is also provided with replacement automatic transmission fluid therein. A filling apparatus is utilized which is connected to the supply tank and to the automatic transmission dipstick tube to continuously supply fresh replacement automatic transmission fluid to the automatic transmission simultaneously with the used fluid flowing to the storage tank. The internal transmission pump is used to pump out the old fluid.

In accordance with another aspect of the present invention, the filling apparatus is designed to match the inflow of replacement fluid to the outflow of used fluid to the storage tank. In accordance with another aspect of the present invention, the filling apparatus includes an air operated pump. An operator controlled solenoid valve controls the flow of new fluid to the transmission.

In accordance with another aspect of the present invention, the apparatus can be powered by a shop air supply or a portable air compressor. The filling apparatus can be timed to provide the proper quantity of replacement fluid to the transmission and then automatically stop the filling process. Similarly, the timer can control the means to connect the line to the storage tank to halt the delivery of the used fluid to the storage tank.

In accordance with another aspect of the present invention, a method for flushing an automatic transmission is provided. The automatic transmission is equipped with a transmission fluid cooler with a first line extending from the transmission to the transmission cooler to supply the fluid to the cooler for cooling and a second line extending from the cooler to the transmission to supply the cooled fluid from a cooler to the transmission. The method includes the step of simultaneously removing used fluid from one of the lines for delivery to a storage tank and filling the transmission with replacement fluid at the same rate. The method further includes the step of automatically halting the supply of replacement fluid to the transmission and automatically stopping the discharge of fluid from the line to the storage tank when the transmission has been flushed.

BRIEF DESCRIPTION OF THE DRAWINGS

For a more complete understanding of the present invention, and the advantages thereof, reference is now made to the following description, taken in conjunction with the accompanying drawings, in which.

DETAILED DESCRIPTION

Figure 1:
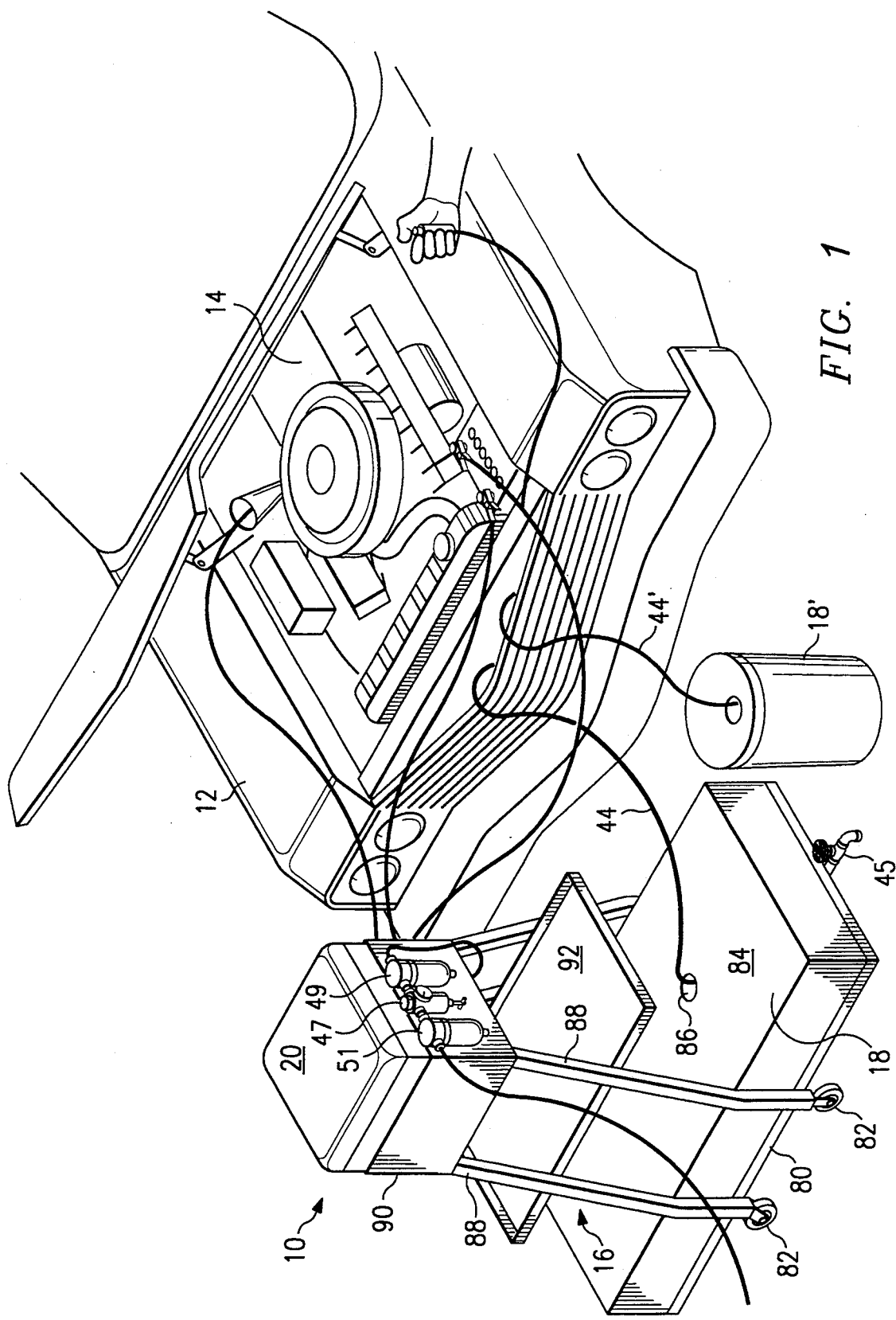
FIG. 1 is a perspective view of one apparatus forming a first embodiment of the present invention.
Figure 2:
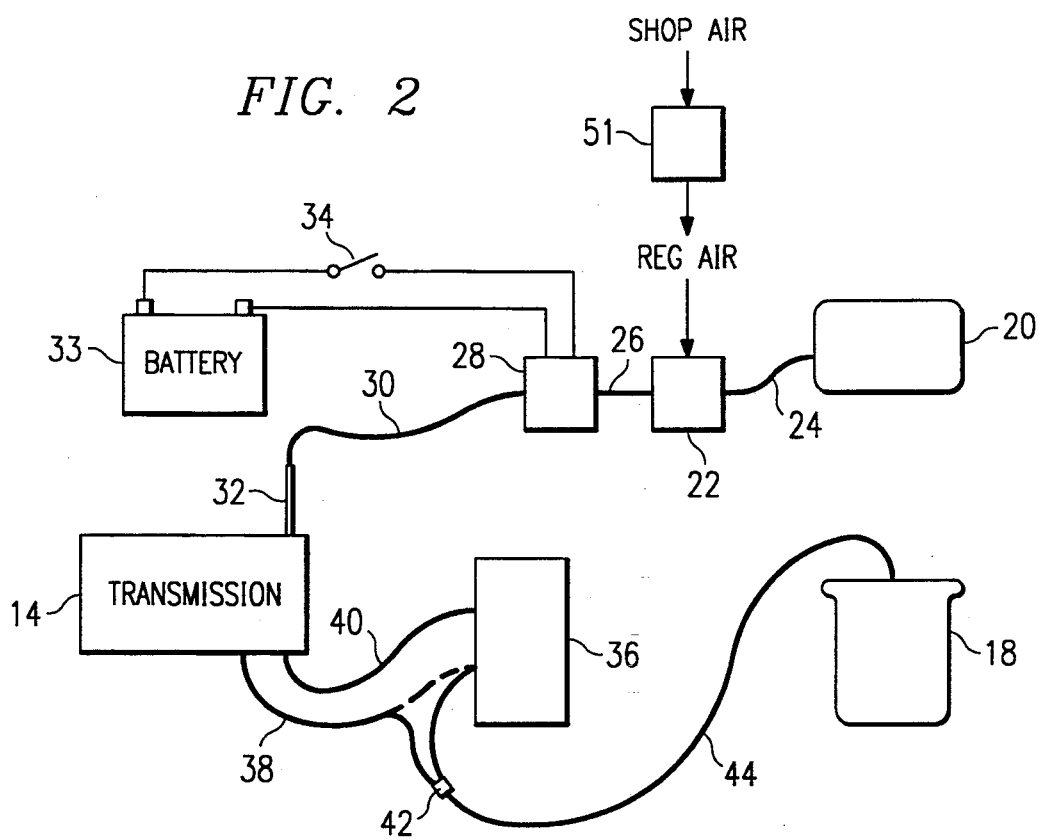
FIG. 2 is a flow chart of the flow of fluids in the apparatus.

With reference now to the drawings, an apparatus 10 is illustrated which forms a first embodiment of the present invention. The apparatus 10 is utilized to flush used transmission fluid from a vehicle 12 while simultaneously replacing the used fluid with replacement fluid. As will be described in greater detail, the apparatus 10 is capable of essentially purging all the used fluid from the transmission 14 in the vehicle to insure that no used fluid will be retained in the transmission after the flushing operation. With specific reference to FIGS. 1 and 2, the apparatus 10 can be seen to include a cart 16 which mounts a storage tank 18 and a supply tank 20. The storage tank 18 will store the used fluid from the transmission for disposal or recycling. The supply tank 20 contains replacement transmission fluid which will be used to fill the transmission.

Also mounted on the cart 16 is an air operated pump 22 which has an inlet connected to the supply tank through hose 24. The outlet of the air pump is connected to a hose 26 which extends to a solenoid operated valve 28. A hose 30 extends from the outlet of the solenoid operated valve 28 to the inlet tube 32 of the transmission being flushed. The solenoid operated valve 28 is preferably operated by 12 volt direct current, preferably connected to the battery 33 of the vehicle, and a switch 34 which the operator can use to activate the solenoid valve from a remote location.

The apparatus 10 is designed for use with a vehicle having a transmission cooler 36. Typically, a first line 38 will extend from the transmission to the cooler 36 to deliver transmission fluid to be cooled. A similar second line 40 extends from the cooler to the transmission to return the cooled fluid to the transmission. The apparatus 10 includes a "Y" connector 42. One of the lines 38 or 40 is disconnected from the cooler and one end of the "Y" connector inserted in the free end of the disconnected line, and the other end of the "Y" connector into the empty hole in the radiator. A hose 44 is attached to "Y" connector 42 and extends to the storage tank 18. If desired, a stand alone storage tank 18' can be used instead of tank 18 and used transmission fluid will flow through hose 44' to tank 18'.

In operation, the engine of the vehicle 12 will be started. This will, in a typical automobile, cause the operation of a pump within the transmission which supplies the transmission fluid to the operating components of the transmission. The outlet of the pump is usually connected directly to the cooler through line 38. However, with the connector 42 in place, the pump within the transmission operates to pump the used fluid directly from the transmission to the storage tank 18. Because the transmission pump is operating and the components within the transmission are active as the engine runs, the transmission will essentially pump all of the used transmission fluid therefrom and into the storage tank.

Simultaneously, the operator will close the switch 34, opening the solenoid valve 28 and permitting replacement fluid to be pumped from the supply tank 20 directly into the dipstick tube 32 of the transmission to replace the fluid being pumped out by the pump of the transmission. Preferably, the pump will be controlled to pump in replacement fluid at essentially the same rate as the used fluid is being removed to the storage tank.

This process will continue until all the used transmission fluid has been removed from the transmission. This can be observed visually by detecting a color change in the fluid being discharged into the storage tank 18 from a somewhat darker color typically associated with used transmission fluid to the brighter color found in unused replacement fluid. Alternatively, the apparatus can be used for a set period of time which is adequate to purge the transmission of the particular vehicle being flushed.

When the flushing procedure is complete, the connector 42 is removed from the line that was disconnected and the line is then reconnected to the cooler. The hose 30 is removed from the inlet tube of the transmission and the 12 volt power connections for the solenoid operated valve 28 are removed from the vehicle battery.

In one apparatus constructed in accordance with the teachings of the present invention, the cart 16 has a base platform 80 made up of one inch angle iron built in a rectangular shape 34"×23". This platform will have four casters 82 attached to the bottom with the casters preferably being two inches in diameter. The storage tank is mounted on the rectangular platform 80 and is formed by a rectangular light plastic storage container 84 measuring 34"×23" by 11-½" high. A two inch hole 86 is formed in the top of the storage container near the middle for attachment of the hose 44. A one inch pipe drain plug made up of a 90° standard faucet 45 fitting with PVC pipe is attached to the center of the bottom of the container for later transferring the used fluid into a bulk storage holding tank or otherwise disposing of or reprocessing the used fluid.

To the platform frame base is attached box steel vertical supports 88 that come up approximately 12 inches and then have an angle so that they come together at the center at an angle of about 10°. This supports another platform 90 that is approximately 39" above the base platform. This second platform 90 will hold the supply tank 20. This platform is approximately nine inches tall and made of 16 gauge steel, bent in a rectangular shape. The floor of this platform is 10"×14". The supply tank 20 has a capacity of approximately 5 to 8 gallons and can be readily lifted off the platform for refilling. Preferably, the supply tank is transparent so that the operator can see the fluid level inside. The supply tank will typically having an air vent to prevent the collapsing of the tank as fluid is removed by the pump 22. A tool tray 92 having dimensions 24"×16-½" with a one inch vertical lip, can be formed of 16 gauge steel and welded in the cart between the tanks.

The hose 24 is a three-eighths inch fuel line. The air operated pump 22 can be run off shop compressed air or by a dedicated portable air compressor used with the apparatus 10. A pressure regulator 47, air filter 49 and oiler 51 are preferably mounted on the upper platform to regulate the air pressure to the air operated pump. It has been found in practice that a regulated pressure of about 40 pounds per square inch has resulted in approximately the flow desired.

The switch 34 is preferably provided with sufficient cable, for example 10 feet, to allow the operator to actually be behind the wheel of the car or vehicle, start the engine, put it in park, neutral or drive as desired, and still operate the apparatus remotely.

Figure 3:
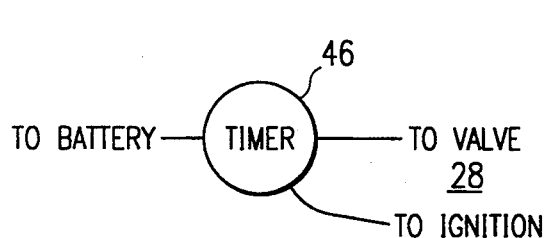
FIG. 3 is a partial flow chart showing substitution of a timer in the apparatus.

With reference now to FIG. 3, a modification of apparatus 10 is illustrated. In this modification, a timer 46 is substituted for the switch 34 which will automatically turn on the solenoid valve and shut it off after the expiration of a predetermined time. A table can be compiled of the appropriate time necessary to flush a range of vehicles.

In FIG. 3, the timer 46 can also be used to control the ignition of the vehicle so that the timer will actually start, run and then stop the vehicle motor automatically.

Figure 4:
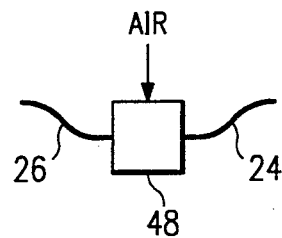
FIG. 4 is a partial flow chart showing substitution of an air operated valve in the apparatus.

With reference to FIG. 4, another modification of apparatus 10 is illustrated. In this modification, the solenoid operated valve 28 is replaced by an air operated valve 48. The switch 34 would be replaced by an operator-controlled or timer-controlled valve to supply air to the air-operated valve 48 to control its operation.

Figure 5:
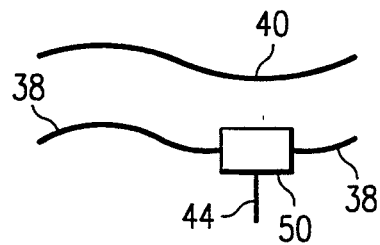
FIG. 5 is a partial view of a schematic showing a timed bypass valve for the fluid line.

With reference now to FIG. 5, another modification of apparatus 10 is illustrated which includes a two-way valve 50 which is inserted in one of the lines 38 and 40. The two-way valve 50 can be controlled by the operator through switch 34 or by the timer 46 to route the fluid passing through the line directly to the storage tank when flushing and to switch the flow through the line to the cooler after the flushing has been completed. As such, the valve 50 can be left permanently in the line in the automobile and the hose 44 simply connected to the suitable outlet of the valve 50 when the flushing operation is to be undertaken.

One advantage of a timer-controlled apparatus is that the operation can be done in the absence of an operator. The operator can set up the apparatus and begin its operation. The operation will then continue automatically and stop when completed so that the operator can proceed to undertake other tasks and return to the apparatus when convenient.

Other modifications include mounting a cork insert on the hose 30 which would provide a better attachment between the hose and the inlet tube 32. Also, a quick disconnect plug could be mounted in one of the lines 38 or 40 when utilized with fleet vehicles, such as taxis, buses, police and emergency vehicles, to allow easier access to the cooler lines for more efficient operation.

The intent of the apparatus is for it to be used by professional mechanics who are familiar with automatic transmission operation and problems associated with the continued use of old and degraded fluid. Further, the apparatus is intended to offer a selling feature to full service shops and service dealerships to increase their profit by selling a heretofore unavailable service. It is envisioned that it will be particularly valuable in shops servicing consumer trucks such as pick-ups. Actual operation of the apparatus indicates that a complete flush can be done in under five minutes from start to stop for most applications.

It will be understood that the above description is of a preferred exemplary embodiment of the invention it is meant to be illustrative, not limiting. Modifications may be made in the structural features of the invention without departing from the scope of the invention expressed in the appended claims.

We claim:

1. An apparatus to flush fluid from an automatic transmission in a vehicle, the automatic transmission having a fill tube for filling the transmission with automatic transmission fluid, the vehicle having a transmission cooler with at least one line extending to the transmission cooler from the transmission to carry fluid therebetween, comprising:
   a storage tank;
   means to connect said line to the storage tank to direct used automatic transmission fluid flowing through the line into the storage tank, said means permitting only fluid discharge from said line;
   a supply tank with replacement automatic transmission fluid; and
   a filling apparatus connected to the supply tank having a pump independent of the automatic transmission to continuously supply replacement automatic transmission fluid to the fill tube of the automatic transmission simultaneous with the used fluid flowing to the storage tank.

2. The apparatus of claim 1 wherein the inflow rate of replacement transmission fluid from the supply tank to 3. The apparatus of claim 1 wherein the pump of said filling apparatus is an air operated pump.

4. The apparatus of claim 1 wherein the filling apparatus includes a solenoid valve to control flow from the supply tank to the transmission, the solenoid valve operated by 12 volts direct current, said solenoid valve being connected to a battery in the vehicle for operation.

5. The apparatus of claim 1 wherein the vehicle has a transmission cooler with two lines extending between the transmission cooler and the transmission, one of said lines being an outlet line with automatic transmission fluid flowing through the outlet line from the automatic transmission to the transmission cooler, the other of said lines being a return line carrying automatic transmission fluid from the transmission cooler to the automatic transmission, the apparatus further comprising a quick disconnect plug mounted in either of said lines between the transmission and cooler to couple the line to the storage tank.

6. The apparatus of claim 3 wherein a portable supply of compressed air is mounted on the apparatus.

7. The apparatus of claim 1 further including a timer to control the period of time the filling apparatus is connected to the supply tank to supply replacement transmission fluid to the transmission.

8. The apparatus of claim 7 wherein the timer is started by the starting of the engine in the vehicle.

9. The apparatus of claim 1 further having means to stop flow from the line to the storage tank after flushing of the transmission is complete.

10. The apparatus of claim 1 wherein the pump of the filling apparatus provides automatic transmission fluid to the fill tube of the automatic transmission independently of fluid flow through the line to permit the apparatus to fill a previously empty transmission.

11. A method for flushing an automatic transmission in a vehicle, the automatic transmission having a fill tube for filling the automatic transmission with automatic transmission fluid and a pump within the transmission, the vehicle having a transmission fluid cooler with at least one line connecting the transmission to the transmission cooler, comprising the steps of:
   connecting the line to a storage tank;
   starting the engine in the vehicle with the pump within the transmission pumping fluid through the line to the storage tank permitting only fluid discharge from the line to the storage tank;
   simultaneously and continuously supplying replacement transmission fluid from a supply tank pumped from the supply tank to the fill tube of the automatic transmission by a pump operating independently of the pump within the transmission until the transmission has been flushed of used transmission fluid.

12. The method of claim 11 further comprising timing the period the replacement fluid is provided to the transmission.

13. The method of claim 11 wherein the vehicle has a supply line extending between the transmission fluid cooler and the transmission and a return line extending between the transmission fluid cooler and the transmission, the method further comprising the step of connecting one of the lines to the storage tank to drain fluid from the line, eliminating the need to determine the direction of flow through the line.

* * * * *

UNITED STATES PATENT AND TRADEMARK OFFICE
CERTIFICATE OF CORRECTION

PATENT NO. : 5,427,202
DATED : June 27, 1995
INVENTOR(S) : Melvin A. Behring, et al.

It is certified that error appears in the above-indentified patent and that said Letters Patent is hereby corrected as shown below:

```
Col. 5, line 67, add the following to complete the claim:
```

--the transmission equals the outflow rate of the used transmission fluid from the line to the storage tank.--

Signed and Sealed this

Seventh Day of January, 1997

Attest:

BRUCE LEHMAN

*Attesting Officer*    *Commissioner of Patents and Trademarks*